United States Patent Office 3,506,597
Patented Apr. 14, 1970

3,506,597
POLYMERIZATION OF OLEFIN OXIDES
Harumi Asai, Tokyo, Histaka Komai, Yokohama, and Ryuichiro Yoda, Tokyo, Japan, assignors to The Japanese Geon Company, Ltd., Tokyo, Japan, a corporation of Japan
No Drawing. Filed June 27, 1966, Ser. No. 560,879
Claims priority, application Japan, July 7, 1965, 40/40,309
Int. Cl. C08g 23/14
U.S. Cl. 260—2          7 Claims

ABSTRACT OF THE DISCLOSURE

Method for the production of an olefin oxide polymer using a catalytic system composed of either (1) an organo-aluminum compound respresented by formula $AlX_nR_{3-n}$ and a chelate compound of a metal of Groups I to III of the Periodic Table, or (2) an organo-aluminum compound represented by the formula $AlX_nR_{3-n}$, a chelate compound of a metal of Group I to III of the Periodic Table and water.

This invention relates to a novel method for the polymerization of olefin oxides, and more particularly to a method for the polymerization or copolymerization of olefin oxides using a catalyst system consisting of an organo aluminum compound and a chelate compound of a metal of Groups I to III of the Periodic Table.

An object of this invention is to provide a very distinctive and valuable rubbery substance by homopolymerizing or copolymerizing monomers having an 1,2-epoxy group such as, for example, propylene oxide or epichlorohydrin.

The catalyst system to be used in this invention comprises either (1) a system consisting of an organo aluminum compound and a chelate compound of a metal of Groups I to III of the Periodic Table; or (2) a system consisting of an organo aluminum compound, a chelate compound of a metal of Groups I to III of the Periodic Table and water.

The organo aluminum compound which is one of the components of the polymerization catalyst system of this invention is a compound having the formula $AlX_nR_{3-n}$, wherein $n$ is a number from 0 to 2, X is a halogen and R is an alkyl group. These organo aluminum compounds include, e.g., triethylaluminum, triisobutylauminum trihexylaluminum dimethylaluminum fluoride, dimethylaluminum chloride, dimethylaluminum bromide, diisopropylaluminum chloride, isobutylaluminum dichloride, and ethylaluminum sesquichloride etc., or an alkylaluminumhalide mixture obtained by direct reaction of metallic aluminum with an alkyl halide, or an alkylaluminumhalide mixture obtained by mixing an alkyl aluminum and an aluminum halide.

The metal chelate compound, which is to be used as the other component of the polymerization catalysts system of this invention, is a chelate compound of a metal of Groups I to III of the Periodic Table, e.g., lithium, sodium, potassium, magnesium, calcium, zinc, copper and aluminum, etc. The chelating agent to be used for preparing the chelate compound is one having in its molecules either carbonyl or hydroxyl group, or both. Especially, suitable is the hydroxyenol compound having a hydroxyl group at the carbon atom in the beta position of the carbonyl group or phenol compound. This type of unsaturated organic hydroxycarbonyl compound is characterized by the structure.

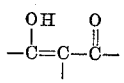

As the chelating agent suitable for preparing the metal chelate compound of this invention, in particular, esters of β-keto-acid, β-diketones, o-hydroxyphenyl carbonyl compounds, amides of β-keto-acid and hydroxyquinones may be cited. The esters of β-keto-acid includes methyl aceto-acetate, butyl aceto-acetate, amylalpha-acetobutyrate, propyl benzoylacetoacetate etc.; the β-diketones includes 2,4-pentanedione, 3-methyl-2,4 - pentanedione, 3,5-heptanedione, benzoyl acetone etc.; the o-hydroxyphenyl carbonyl compounds includes salicylaldehyde, o-hydroxyacetophenone, p-butoxy-o-hydroxypropiophenone, ethyl-o-hydroxybenzoate etc.; the amides of β-keto-acid includes acetoaceto-p-anilide, acetoacetoanilide, N - ethylacetoactamide etc.; and the hydroxyquinones includes chloranilic acid, hydroxynaphthoquinone, hydroxyanthraquinone, etc.

Typical examples of the chelate compounds of the metals of Groups I to III of the Periodic Table include such as acetoacetic ester copper, acetylacetone calcium, acetylacetone magnesium, acetylacetone barium, acetylacetone zinc, acetylacetone cadmium, acetylacetone copper, acetylacetone aluminum, acetylacetone potassium, acetylacetone sodium, acetylacetone lithium, acetylacetone beryllium, salicylaldehyde copper, 5 - oxynaphthoquinone copper, alizarin aluminum, alizarin calcium, alizarin copper, barium chloranilate, calcium chloranilate, etc.

Examples of the structure of these metal chelate compounds are illustrated below. It is believed that the other metal chelate compounds also have similar structures.

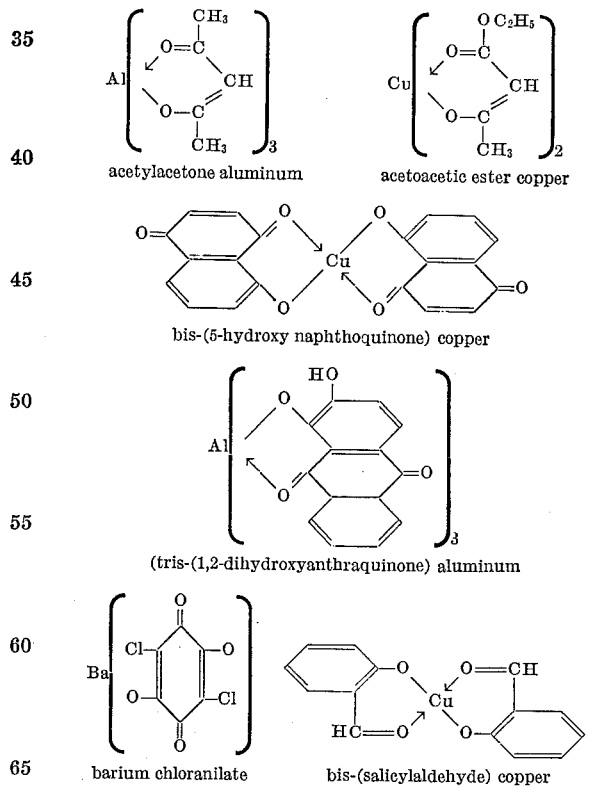

acetylacetone aluminum          acetoacetic ester copper bis-(5-hydroxy naphthoquinone) copper (tris-(1,2-dihydroxyanthraquinone) aluminum barium chloranilate          bis-(salicylaldehyde) copper The preparation of these metal chelate compounds may be carried out easily by customary procedure. For instance, acetylacetone copper can be readily obtained by adding hot saturated aqueous solution of acetylacetone to an aqueous solution of copper acetate.

The proportion in which the organo aluminum compound, the chelate compound of a metal of Groups I to III of the Periodic Table and water are used, can be relatively varied over a wide range. The molar ratio of the organo aluminum compound to the metal chelate compound is within the range of 5.0 to 0.05, preferably 2.0 to 0.2. On the other hand, the molar ratio of the organo aluminum compound to water can be varied within the range of 5.0 to 1.0, but a range of 3.0 to 1.0 is preferred.

These three or two components react with each other to form the catalyst system of this invention which is novel and exhibits very high activity. The catalytic activity of the catalyst system somewhat differs depending on the particular sequence by which the aforesaid components are blended, but in all cases a catalyst system useful for the method of this invention is obtained regardless of the order of blending the components. Particularly, preferred sequence of blending is, for instance, when water is employed as one of the components, the metal chelate compound—the organo aluminum compound—water. The amount of the catalyst to be used in the polymerization can also be varied over a wide range. It can be suitably used in an amount within such a wide range as from 0.001 mol percent to 10 mol percent to the monomer.

As the olefin oxide monomers which can be polymerized according to this invention, the following may be considered; alkylene oxides such as ethylene oxide, propylene oxide, 1-butene oxide, 2-butene oxide, isobutylene oxide and 1-hexene oxide, etc.; cyclohexene oxide; styrene oxide; glycidyl ethers of phenol and bisphenol; halogen-containing epoxide monomers such as vinyl chloride epoxide, epichlorohydrin, $\beta$ - methyl - epichlorohydrin, epibromohydrin, epifluorohydrin, trifluoromethyl ethylene oxide, perfluoropropylene oxide, perfluoroethylene oxide, etc.; and epoxide monomers having olefinically unsaturated bonds such as vinylcyclohexene monoxide, allylglycidyl ether, glycidylmethacrylate, butadiene monoxide, 2-methyl-5,6-epoxyhexene-1, etc.

The olefin oxide monomer used in this invention is not necessarily limited to only one of those monomers, but two or more monomers can be concurrently employed.

The unsaturated olefin oxide monomers can be copolymerized with the foregoing saturated olefin oxide monomers to provide vulcanizable polymers having olefinically unsaturated bonds.

In performing the polymerization using the catalyst system of this invention, the use of a solvent or a diluent is not particularly required. Whereas, either of them may be optionally used insofar as it has no detrimental effect on the catalyst system and the monomer or monomers to be polymerized. For instance, inert hydrocarbons such as aliphatic, aromatic, cycloaliphatic or olefinically unsaturated hydrocarbon may be used.

The polymerization method of this invention can be carried out under a wide range of temperature and pressure. Normally the polymerization temperature is within the range of −50° C. to 200° C., while the polymerization pressure, within that of 1 to 200 atmospheres.

Both the preparation of the catalyst system and the polymerization may be performed batchwise or continuously. If desired, it is also possible to perform the polymerization continuously in the phase of reaction mixture having a predetermined composition under agitation.

The polymer prepared in accordance with this invention is a rubber-like substance and is useful as a starting material for preparing rubber products.

The following examples are given for illustrating the invention.

EXAMPLE 1

A well dried pressure-resistant 200-ml. glass polymerization vessel was filled with dried nitrogen. After which it was charged with 25 ml. of benzene dried with calcium hydride, followed by the addition of 0.081 g. (0.00025 mol) of acetylacetone aluminum, 0.062 g. (0.0005 mol) of triethylaluminum, 8.3 g. of propylene oxide dried with calcium hydride and 0.0045 g. (0.00025 mol) of water, in the sequence given. The reaction mixture was then polymerized by stirring for 3 hours at 70° C. After polymerization the reaction was stopped by addition of acetone to the reaction mixture, benzene was added to drop the solvent viscosity and then polymerization catalyst was removed by repeated washings with 1 N hydrochloric acid. The reaction mixture was then neutralized with an aqueous sodium bicarbonate solution and washed with water, followed by reducing the pressure to evaporate the solvent, whereupon an elastomeric solid polymer was obtained at a yield of 32.3%.

The inherent viscosity of this polymer measured as a solution obtained by dissolving the polymer in benzene at 30° C. was 15.7. (Unless otherwise specified, the inherent viscosities hereinafter indicated are all measured under the above-described conditions.)

EXAMPLES 2–5

When the sequence of adding the catalysts in Example 1 was varied as shown in Table I, solid polymers of high molecular weight were still obtained.

TABLE I

| Example | Sequence of addition (left to right) | Yield percent | Inherent viscosity |
|---|---|---|---|
| 2 | Benzene, water, II,* I,* PO* | 20.5 | 14.3 |
| 3 | Benzene, I, water, II, PO | 33.0 | 10.8 |
| 4 | Benzene, I, II, water, PO | 18.1 | 14.0 |
| 5 | Benzene, PO, water, I, II | 13.1 | 4.4 |

*I=acetylacetone aluminum, II=triethylaluminum, PO=propylene oxide.

EXAMPLES 6–15

When Example 1 was repeated except that the molar quantity used of triethylaluminum was held constant but the amounts used of water and acetylacetone aluminum were varied as shown in Table II, solid polymers were still obtained in all cases.

TABLE II

| Example | Acetylacetone aluminum/triethylaluminum | Water/triethylaluminum | Yield, percent | Inherent viscosity |
|---|---|---|---|---|
| 6 | 0.1 | 0.0 | 3.2 | 0.8 |
| 7 | 0.1 | 1.0 | 34.1 | 10.4 |
| 8 | 0.4 | 0.4 | 32.5 | 8.5 |
| 9 | 0.4 | 0.7 | 37.0 | 11.2 |
| 10 | 0.7 | 0.7 | 35.5 | 10.7 |
| 11 | 1.0 | 0.7 | 30.8 | 9.3 |
| 12 | 1.5 | 0.7 | 36.6 | 10.5 |
| 13 | 2.0 | 0.0 | 4.3 | 4.4 |
| 14 | 2.0 | 0.4 | 26.7 | 7.8 |
| 15 | 2.0 | 0.7 | 30.6 | 10.3 |

EXAMPLES 16–17

Solid polymers were also obtained even when other organo aluminum compounds such as indicated in Table III were substituted for the triethylaluminum in Example 1.

TABLE III

| Example | Organo aluminum compound | Yield percent | Inherent viscosity |
|---|---|---|---|
| 16 | Diethylaluminum chloride | 21.0 | 4.8 |
| 17 | Ethylaluminum dichloride | 3.0 | 1.2 |
| 18 | Tri-n-hexylaluminum | 25.4 | 8.7 |

EXAMPLES 19–29

Solid polymers were also obtained even when other metal chelate compounds such as indicated in Table IV were substituted for the acetylacetone aluminum in Example 1.

TABLE IV

| Ex. | Metal chelate compound | Water | Yield, percent | Inherent viscosity |
|---|---|---|---|---|
| | Acetylacetone: | | | |
| 19 | Zinc | Not used | 1.9 | 2.4 |
| 20 | Magnesium | do | 13.1 | 2.4 |
| 21 | Barium | do | 1.2 | 0.55 |
| 22 | Calcium | do | 6.8 | 2.5 |
| 23 | Zinc | Used | 13.6 | 1.7 |
| 24 | Magnesium | do | 15.5 | 4.3 |
| 25 | Barium | do | 1.0 | 0.60 |
| 26 | Calcium | do | 4.8 | 5.6 |
| 27 | Lithium | do | 7.4 | 1.5 |
| 28 | Sodium | do | 1.3 | 0.56 |
| 29 | Potassium | do | 1.1 | 0.82 |

EXAMPLES 30–35

Example 1 was repeated except that in the case of the metal chelate compound the class was varied, but the amount used was held constant, whereas in the case of the organo aluminum compound, the class and the amount used were varied. Even in this case, solid polymers such as shown in Table V were obtained.

TABLE V

| Example | Alkyl aluminum (I) | Metal chelate compound (II) | Molar ratio of (I)/(II)/H²O | Yield, percent | Inherent viscosity |
|---|---|---|---|---|---|
| 30 | Diethylaluminum chloride. | Acetylacetone magnesium. | 2/1/0 | 3.8 | 2.8 |
| 31 | do | do | 2/1/1 | 2.8 | 1.5 |
| 32 | do | Acetylacetone zinc. | 2/1/0 | 2.6 | 1.2 |
| 33 | do | do | 2/1/1 | 4.2 | 1.6 |
| 34 | Ethylaluminum dichloride. | Acetylacetone aluminum. | 4/1/0 | 4.0 | 1.3 |
| 35 | do | do | 4/1/0.5 | 4.4 | 8.6 |

EXAMPLE 36

Example 1 was repeated except that n-hexane was used in place of benzene, whereupon a solid polymer having an inherent viscosity of 3.94 was obtained at a yield of 11.0%.

EXAMPLES 37–38

Solid polymers were obtained even when the polymerization temperature was varied, as indicated in Table VI, in carrying out the experiment of Example 1.

| Example | Polymerization temperature,° C. | Yield, percent | Inherent viscosity |
|---|---|---|---|
| 37 | 35 | 10.6 | 2.3 |
| 38 | 5 | 4.1 | 1.9 |

EXAMPLES 39–44

A well dried pressure-resistant 200-ml. glass polymerization vessel was filled with dried nitrogen, after which it was charged with 50 ml. of benzene dried with calcium hydride. To the same 0.020 gram of the metal chelate compounds indicated in Table VII and 0.171 gram of triethylaluminum were added in the sequence given. The mixture was then reacted for 2 hours at 60° C., cooled to 25° C., followed by the addition of 0.0135 gram of water. Thereafter, 11.6 grams of dried propylene oxide was immediately charged, and the polymerization reaction was carried out by stirring the vessel for 5 hours at 60° C. Solid polymers as indicated in Table VII were obtained even in this case.

TABLE VII

| Example | Metal chelate compound | Yield, percent | Intrinsic viscosity |
|---|---|---|---|
| 39 | Barium chloranilate | 23.1 | 3.2 |
| 40 | Kojato zinc | 15.7 | 2.9 |
| 41 | Kojato aluminum | 19.4 | 2.7 |
| 42 | Acetyle acetoacetic ester copper | 11.0 | 1.2 |
| 43 | Bis(5-hydroxynaphthoquinone 1,4) copper. | 17.0 | 6.7 |
| 44 | Tris(1,2-dihydroxyanthraquinone) aluminum. | 21.0 | 5.9 |

EXAMPLE 45

Example 1 was repeated except that butene-1 oxide was used instead of propyleneoxide, whereupon a solid polymer having an inherent viscosity of 8.7 was obtained in the polymerization time of 1.5 hours at a yield of 25.7%.

EXAMPLE 46

When a mixture of 5 grams of propylene oxide and 5 grams of butene-1 oxide was used in Example 1, a solid polymer having an inherent viscosity of 3.8 was obtained in the polymerization time of 1.5 hours at a yield of 26.2%.

EXAMPLE 47

A well dried pressure-resistant 200-ml. glass polymerization vessel was filled with dried nitrogen, after which were added 50 ml. of dried n-hexane, 0.034 gram of acetylacetone aluminum, 0.018 gram of water, 0.114 gram of triethylaluminum and 19.1 gram of vinyl cyclohexene monoxide, at intervals of 10 minutes, inthe sequence given.

When this mixture was then polymerized for 24 hours at 70° C., a solid polymer having an inherent viscosity of 0.55 was obtained in an amount of 0.45 gram in this case also.

EXAMPLE 48

A well dried pressure-resistant 200-ml. glass polymerization vessel was filled with dried nitrogen, after which were added thereto at intervals of 5 minutes 50 ml. of benzene dried with calcium hydride, 0.0357 gram of acetylacetone aluminum, 0.016 gram of water, 0.126 gram of triethylaluminum and 11.0 gram of epichlorohydrin in the sequence given, and thereafter the polymerization reaction was carried out by stirring for 3 hours at 60° C. After the polymerization the reaction was stopped by addition of acetone to the reaction mixture, benzene was added to drop the solvent viscosity, and then the polymerization catalyst was removed by repeated washings with 1 N hydrochloric acid. The reaction mixture was then neutralized with an aqueous sodium bicarbonate solution and was washed with water, followed by reducing the pressure to evaporate the solvent, whereupon a solid polymer was obtained at a yield of 63%.

The specific viscosity of this polymer, measured at 50° C. as a solution obtained by dissolving 0.0473 gram of the polymer in 50 ml. of cyclohexanone was 0.24. (Unless otherwise specified, the specific viscosities as hereinafter indicated are all measured under above-described conditions.)

EXAMPLE 49

Example 48 was repeated except that (0.21 gram of) triisobutylaluminum was used in place of triethylaluminum. In this case also, a solid polymer having a specific viscosity of 0.21 was obtained at a yield of 40%.

EXAMPLES 50–53

A well dried pressure-resistant 200-ml. glass polymerization vessel was filled with 0.020 gram of the metal chelate compounds as indicated in Table VIII, then filled with dried nitrogen, after which were added 50 ml. of dried benzene, and 0.171 gram of triethylaluminum. After reacting the mixture for 2 hours at 60° C., it was cooled to 20° C., followed by the addition of 0.0135 gram of water. Five minutes later, 11 grams of dried epichlorohydrin were charged into the vessel, and the polymerization reaction was carried out for 5 hours at 60° C. In this case also, solid polymers as shown in Table VIII were obtained.

TABLE VIII

| Example | Metal chelate compound | Yield, percent | Specific viscosity |
|---|---|---|---|
| 50 | Barium chloranilate | 16.9 | 0.19 |
| 51 | Zinc kozate | 17.1 | 0.17 |
| 52 | Copper kozate | 17.8 | 0.15 |
| 53 | Aluminum kozate | 18.9 | 0.23 |

EXAMPLE 54

When Example 48 was repeated except that the amount of acetylacetone aluminum used was 0.179 gram and water was not used, a solid polymer having a specific viscosity of 0.22 was also obtained at a yield of 7%.

EXAMPLES 55–60

Example 48 was repeated with the following changes: 25 ml. of benzene, 0.0144 gram (0.0008 mol) of water and 0.114 gram (0.001 mol) of triethylaluminum were used, while the amount used of acetylacetone aluminum was varied as indicated in Table IX. When these mixtures were polymerized for 5 hours at 70° C., solid polymers as shown in Table IX were also obtained.

TABLE IX

| Example | Molar ratio, Acetylacetone aluminum triethylaluminum | Yield, percent | Specific viscosity |
|---|---|---|---|
| 55 | 0.1 | 48 | 0.15 |
| 56 | 0.3 | 51 | 0.30 |
| 57 | 0.5 | 46 | 0.21 |
| 58 | 0.8 | 40 | 0.15 |
| 59 | 1.0 | 33 | 0.18 |
| 60 | 1.3 | 29 | 0.17 |

EXAMPLES 61–62

Solid polymers were obtained even when in Example 48 the polymerization reaction was carried out for 5 hours at 60° C., using 0.009 gram of water and 0.171 gram of triethylaluminum and either acetylacetone copper (0.0322 g.) or salicyclaldehyde copper (0.0344 g.) in place of acetylacetone aluminum. A major portion of these solid polymers were insoluble in cyclohexanone even at 100° C., and hence their viscosities could not be measured. It was found by means of X-ray diffraction that the polymers obtained had high crystalline structure.

TABLE X

| Example | Meta chelate compound | Yield, percent |
|---|---|---|
| 61 | Acetylacetone copper | 17 |
| 62 | Salicylaldehyde copper | 9 |

EXAMPLE 63

A well dried pressure-resistant 500-ml. glass polymerization vessel was filled with dried nitrogen, after which were added 180 ml. of benzene dried was calcium hydride, 0.57 gram of acetylacetone aluminum, 0.030 g. of water and 0.40 gram of triethylaluminum, in the sequence given. Then after adding 22 grams of dried epichlorhydrin and 22 grams of dried ethylene oxide, the polymerization reaction was carried out for 24 hours at 40° C., whereupon a solid polymer was obtained at a yield of 15.5%. This polymer, as determined from the value obtained by chlorine analysis, was a copolymer containing 9.3 mol percent of epichlorohydrin.

EXAMPLES 64–68

A well dried pressure-resistant 200-ml. glass polymerization vessel was filled with dried nitrogen, after which were added 50 ml. of benzene dried with calcium hydride, 0.032 gram of aluminum acetylacetonate, 0.009 gram of water and 0.114 gram of triethylaluminum, in the sequence given. This was followed by the addition of dried epichlorohydrin and dried propylene oxide in the ratio indicated in Table XI, after which the polymerization reaction was carried out for 1 hour and 20 minutes at 60° C. Solid polymers as shown in Table XI were obtained in this case also.

TABLE XI

| Example | Amount of monomer charged (g.) | | Yield, percent | Epichlorohydrin in polymer (wt. percent) |
|---|---|---|---|---|
| | Epichlorohydrin | Propylene oxide | | |
| 64 | 2.36 | 8.30 | 13.4 | 12.9 |
| 65 | 4.72 | 6.64 | 9.0 | 20.0 |
| 66 | 7.08 | 4.98 | 8.3 | 31.4 |
| 67 | 7.44 | 3.32 | 6.1 | 43.5 |
| 68 | 11.8 | 1.66 | 5.2 | 58.1 |

EXAMPLES 69–71

When propylene oxide was copolymerized with epoxy-containing monomers having olefinically unsaturated bonds as indicated in Table XII in Example 1, solid polymers were obtained in all cases. The infrared absorption spectra of these polymers indicated the presence of olefinically unsaturated bonds.

TABLE XII

| Example | Unsaturated epoxide monomer | Yield percent | Inherent viscosity |
|---|---|---|---|
| 69 | Allylglycidyl ether | 9.4 | 4.1 |
| 70 | Glycidyl methacrylate | 10.9 | 4.7 |
| 71 | Vinyl cyclohexene monoxide | 21.3 | 3.6 |

EXAMPLE 72

A well dried pressure-resistant 3-liter glass polymerization vessel equipped with a stirrer was filled with dried nitrogen, after which were added 2 liters of dried benzene, 4 ml. of a benzene solution containing 2.8 grams of acetylacetone aluminum, 0.64 gram of water, 40 ml. of a benzene solution containing 8.7 grams of isobutyl aluminum and 460 grams of epichlorohydrin, in the sequence given, followed by polymerization for 5 hours at 60° C. After the polymerization the reaction was stopped by addition of acetone to the reaction mixture, the solvent and unreacted monomer were distilled off by blowing the steam into the mixture to separate the polymer. By vacuum drying, a polymer having a specific viscosity of 0.21 was obtained at a yield of 41.7%.

100 parts of this polymer, 1 part of zinc stearate, 50 parts of carbon black, 5 parts of lead oxide, 2 parts of nickel dibutyl dithiocarbamate and 1.5 parts of 2-mercaptoimidazolin were compounded on a roll and vulcanized by heating for 45 minutes at 155° C. to obtain a product which was a very excellent oil-resistant rubber having the following properties: a tensile strength of 120 kg./cm.$^2$, an elongation of 250%, a rebound elasticity of 22.0% and a degree of volume swelling after immersion in isooctane for 7 hours at 80° C. of 4%.

EXAMPLE 73

A well dried 25-liter stainless steel polymerization vessel equipped with a stirrer was filled with dried nitrogen, after which it was charged with 19.2 kilograms of dried benzene, 2.62 kilograms of dried propylene oxide and 131 grams of dried allylglycidyl ether, followed by the addition of 2.89 grams of water. To this mixed solution was then added a catalyst solution obtained by reacting for 10 minutes at 25° C. 160 ml. of a benzene solution containing 26.2 grams of triethylaluminum and 40 ml. of a benzene solution containing 7.56 grams of acetylacetone aluminum, followed by polymerization for 5 hours at 60° C. After the polymerization the reaction was stopped by addition of 100 ml. of acetone containing 10 grams of phenyl-β-naphthylamine as an antioxidant to the reaction mixture, the solvent and unreacted monomer were distilled off by blowing the steam into the mixture to separate the polymer. By vacuum drying, 570 grams of a rubbery polymer having an inherent viscosity of 7.6 was obtained.

It was shown by its X-ray diffraction that this polymer was completely amorphous.

The product obtained by compounding on a roll 100 parts of this polymer with 10 parts of zinc oxide, 5 parts of sulfur, one part of stearic acid, 55 parts of carbon black, 2 parts of tetramethylthicuramdisulfide, 2 parts of mercaptobenzothiazole and 2 parts of phenyl-β-naphthylamine and vulcanized by heating for 30 minutes at 160° C. had a tensile strength of 142 kg./cm.$^2$, a 300% modulus of 81 kg./cm.$^2$, an elongation of 620%, a hardness (Shore A) of 78, and tear strength of 78 kg./cm.$^2$.

We claim:

1. A method for the polymerization of vicinal epoxy compounds which comprises carrying out the polymerization of at least one olefin 1,2-oxide monomer at a temperature of −50° C. to 200° C. and at a pressure of 1 to 200 atmospheres in the presence of a catalyst system composed of (1) an organo aluminum compound represented by the formula $AlX_nR_{3-n}$, wherein $n$ is a number of 0 to 2, X is a halogen and R is an alkyl of from 1 to 6 carbon atoms, and (2) a chelate compound made up of a metal of Groups I to III of the Periodic Table and a compound having as its sale reactive group in its molecules at least one group selected from the class consisting of carbonyl and hydroxyl groups, the metal atoms of said chelate being bonded only through oxygen atoms.

2. The method according to claim 1 wherein the molar ratio of the organo aluminum compound to the chelate compound is within the range of 5.0 to 0.05.

3. The method according to claim 1 wherein the organo aluminum compound and the chelate compound are present at such a ratio that the total thereof is 0.001–10 mol percent based on the olefin 1,2-oxide monomer.

4. A method for the polymerization of vicinal epoxy compounds which comprises carrying out the polymerization of at least one olefin 1,2-oxide monomer at a temperature of −50° C. to 200° C. and at a pressure of 1 to 200 atmospheres in the presence of a catalyst system composed of (1) an organo aluminum compound represented by the formula $AlX_nR_{3-n}$, wherein $n$ is a number of 0 to 2, X is a halogen, and R is an alkyl of from 1 to 6 carbon atoms, (2) a chelate compound made up of a metal of Groups I to III of the Periodic Table and a compound having as its sale reactive group in its molecules at least one group selected from the class consisting of carbonyl and hydroxyl groups, the metal atoms of said chelate being bonded only through oxygen atoms, and (3) water.

5. The method according to claim 4 wherein the organo aluminum compound, the chelate compound and water are present such that the molar ratio of the organo aluminum compound to the chelate compound is within the range of 5.0 to 0.05 while the molar ratio of the organo aluminum compound to water is within the range of 5.0 to 1.0.

6. The method according to claim 4 wherein said three components of organo aluminum compound, chelate compound and water are present in an amount such that the total thereof ranges from 0.001 to 10 mole percent based on the olefin 1,2-oxide monomer.

7. The process of preparing polymeric epoxides which comprises contacting under polymerizing conditions at least one monomeric oxirane monoepoxide with a catalyst composition consisting of (1) aluminum triacetyl acetonate (2) an organoaluminum compound selected from the group consisting of aluminum alkyl and aluminum alkyl halide in which the alkyl group is from 1 to 6 carbon atoms and (3) water, wherein the organo aluminum compound and the aluminum triacetylacetonate are present in an amount such that the molar ratio of the organo aluminum to the chelate compound is within the range of 0.05 to 5 and the molar ratio of water to the organoaluminum compound is within the range 0.2 to 1.

References Cited

UNITED STATES PATENTS 3,106,549 10/1963 Vandenberg.
3,205,183 9/1965 Vandenberg.
3,135,705 6/1964 Vandenberg.

WILLIAM H. SHORT, Primary Examiner

T. PERTILLA, Assistant Examiner

U.S. Cl. X.R.

260—47, 88.3